United States Patent
Miyazaki et al.

(10) Patent No.: US 7,163,389 B2
(45) Date of Patent: Jan. 16, 2007

(54) EXTRUSION DIE FOR HONEYCOMB EXTRUSION MOLDING AND MANUFACTURING METHOD THEREFOR

(75) Inventors: Makoto Miyazaki, Nagoya (JP); Koji Okada, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 130 days.

(21) Appl. No.: 10/229,019

(22) Filed: Aug. 28, 2002

(65) Prior Publication Data
US 2003/0064126 A1 Apr. 3, 2003

(30) Foreign Application Priority Data
Sep. 19, 2001 (JP) ............... 2001-285669

(51) Int. Cl.
*B29C 47/12* (2006.01)
(52) U.S. Cl. ............ 425/380; 425/461; 425/467; 264/177.12
(58) Field of Classification Search .............. 425/380, 425/467, 461; 264/177.12
See application file for complete search history.

(56) References Cited

U.S. PATENT DOCUMENTS

| | | | | |
|---|---|---|---|---|
| 4,349,329 | A | * | 9/1982 | Naito et al. ............ 425/461 |
| 4,362,495 | A | * | 12/1982 | Naito et al. ............ 425/380 |
| 5,807,590 | A | | 9/1998 | Ishikawa et al. |
| 6,193,497 | B1 | | 2/2001 | Suzuki |
| 6,248,421 | B1 | | 6/2001 | Koike et al. ............ 428/118 |
| 6,290,837 | B1 | | 9/2001 | Iwata et al. |
| 6,299,813 | B1 | * | 10/2001 | Brew et al. ............ 264/177.12 |
| 6,656,564 | B1 | * | 12/2003 | Ichikawa et al. ........ 428/116 |
| 6,732,621 | B1 | | 5/2004 | Iwata et al. |
| 2002/0192426 | A1 | * | 12/2002 | Ichikawa et al. ........ 428/116 |

FOREIGN PATENT DOCUMENTS

| | | | |
|---|---|---|---|
| DE | 3431892 | * | 3/1986 |
| DE | 3431892 | A1 | 3/1986 |
| EP | 0 137 572 | A1 | 4/1985 |
| EP | 0 294 106 | A2 | 12/1988 |
| JP | 02-102004 | | 4/1990 |
| JP | B2 2502144 | | 3/1996 |
| JP | A-08-90534 | | 4/1996 |
| JP | A-10-309713 | | 11/1998 |
| JP | A-10-315213 | | 12/1998 |
| JP | 11-058337 | * | 3/1999 |
| JP | A-11-58337 | | 3/1999 |
| JP | A 2000-127130 | | 5/2000 |
| JP | 2001-150422 | | 6/2001 |
| JP | 2001150422 | * | 6/2001 |

OTHER PUBLICATIONS

Belgian International Search Report, BE200200545, published Sep. 9, 2003.*

* cited by examiner

*Primary Examiner*—Joseph S. Del Sole
(74) *Attorney, Agent, or Firm*—Oliff & Berridge, PLC

(57) ABSTRACT

An extrusion die for extrusion molding of a honeycomb structure has back holes for introducing a raw material to be molded and slits for extruding the raw material. The extrusion die comprises an inside section, an outer peripheral section, and an outermost peripheral section; the width of the slit 14 disposed in the outer peripheral section is wider than the width of the slit disposed in the inside section; and when the surface roughness (Ra) of the slits in the inside section and the outer peripheral section is 0.1 μm or smaller, or when the surface roughness (Ra) of the slits in the inside section and the outer peripheral section exceeds 0.1 μm, the relationship between the surface roughness a of slit in the inside section and the surface roughness b of slit in the outer peripheral section satisfies the condition that 0.1<a/b<10.

8 Claims, 8 Drawing Sheets

PRIOR ART

PRIOR ART

EXTRUSION DIE FOR HONEYCOMB EXTRUSION MOLDING AND MANUFACTURING METHOD THEREFOR

BACKGROUND OF THE INVENTION AND RELATED ART STATEMENT

1. Field of the Invention

The present invention relates to an extrusion die for honeycomb extrusion molding and a manufacturing method therefor.

2. Description of the Related Art

A conventional automobile exhaust gas purifying catalyst is what is called a honeycomb catalyst in which a catalyst component is carried on each cell surface of a ceramic honeycomb carrier (honeycomb structure). Since the strength in the axial direction thereof is higher than the strength in the cross-sectional (radial) direction, a construction in which the honeycomb carrier is held in the axial direction has been used. In this case, to prevent breakage occurring near the outer peripheral portion when the honeycomb carrier is held in the axial direction, cell walls (ribs) in the outer peripheral section is made thicker than those in the inside section, by which the axial compressive strength of the honeycomb carrier is increased.

However, in recent years, a decrease in pressure loss in the honeycomb catalyst has been required in response to a tendency for higher engine output, and the effective use of the whole of catalyst carrier has been required in response to strengthened exhaust control. To meet these requirements, a construction has begun to be used in which the honeycomb catalyst carrier is not held in the axial direction, but is mainly held on the outer peripheral surface of the honeycomb catalyst carrier. One reason for this is that since the volume of catalyst is increased and the mass of catalyst is increased by the strengthened exhaust control, the axial holding cannot hold the honeycomb carrier sufficiently against engine vibrations because of a small holding area.

Also, on the other hand, to increase the purifying performance of catalyst, a move for decreasing the heat capacity of catalyst and improving the warm-up characteristics of purifying performance has been started by decreasing the cell wall thickness of honeycomb carrier to reduce the weight of honeycomb carrier.

Therefore, there is a tendency for the fracture strength against the external pressure from the outer peripheral surface of honeycomb carrier to be further decreased by the thinner cell wall.

Furthermore, since the exhaust control has recently been strengthened further, the temperature of exhaust gas has increased year by year to improve the engine combustion conditions and to increase the catalyst purifying performance. Accordingly, the requirement for thermal shock resistance of the honeycomb carrier has been made stringent.

Thus, the thinner cell wall, the use of holding method of outer peripheral surface of honeycomb carrier, and the increase in exhaust gas temperature have presented big problems of the setting of thickness of cell wall and honeycomb external wall, the increase in isostatic strength of honeycomb structure, and the high accuracy of outside shape and wall shape.

In view of the above situation, Japanese Patent Application No. 2000-236122 has proposed a ceramic honeycomb structure 1 shown in FIGS. 9 and 10.

As shown in FIG. 9, the ceramic honeycomb structure 1 is made up of a plurality of adjoining cell walls (ribs) 2 forming a cell composite and an external wall 4 which surrounds and holds an outermost cells located at the outermost periphery of the cell composite, and is composed of a composite of a plurality of through holes (cells) partitioned by the cell walls 2.

Also, as shown in FIG. 10, the ceramic honeycomb structure 1 has outermost peripheral cells 8 located closest to the external wall 4, and second cells 9 inwardly from the outermost peripheral cells 8 are continuous. The cell walls 2 are broadly divided into outer peripheral cell walls 2a having a large wall thickness and basic cell walls 2b having a small wall thickness.

Thereby, in comparison with the conventional ceramic honeycomb structure, the above-described ceramic honeycomb structure can realize well-balanced harmony between disadvantages of increased pressure loss and decreased thermal shock resistance and advantages of increased isostatic strength and highly accurate wall and honeycomb structure shapes, so that this ceramic honeycomb structure is anticipated as an automobile exhaust gas purifying catalyst carrier or the like.

An extrusion die used when the above-described honeycomb structure is extrusion molded is, for example, one as shown in FIG. 1. Usually, a slit narrow portion (for example, 2 mil [about 0.05 mm]) of an inside section 22 is machined by grinding or wire electrical discharge, and a slit wide portion (for example, 3 mil [about 0.075 mm]) of an outer peripheral section 24 is machined by electrical discharge using a carbon electrode.

However, for the above-described extrusion die 10, since the slit width of the inside portion 22 and the slit width of the outer peripheral section 24 are different from each other, if the slits are machined only by grinding using a disk-shaped grinding stone, in the vicinity of the boundary between the inside section 22 and the outer peripheral section 24, a locus (hatched portion in FIG. 5(b)) due to grinding stone cut depth and contact arc is drawn, for example, as shown in FIG. 5(b), and a difference is made between the slit depth $L_1$ of the wide portion in the X direction and the slit depth $L_2$ of the wide portion in the Y direction.

Therefore, the ceramic honeycomb structure which is extrusion molded by using the above-described extrusion die has a problem in that cell deformation defects 30 are produced at the boundary between the outer peripheral cell wall 2a and the basic cell wall 2b as shown in FIGS. 6 and 7.

Also, the slit wide portion of the outer peripheral section 24 is machined by electrical discharge using a carbon electrode, and particularly when an extrusion die with a slit width of 2 to 3 mil (about 0.05 to 0.075 mm) or narrower is manufactured, the machining accuracy (±2 to 3 μm) of slit width is insufficient. Also, there is a difference in surface roughness of machined surface between grinding and electrical discharge machining. Therefore, the ratio of surface roughness of the outer peripheral section 24 to the inside section 22 is as high as 10 and more, which presents a problem of poor extrusion pattern of extrusion die.

Further, for the above-describe extrusion die 10, since the slit width in the inside section 22 is different from the slit width in the outer peripheral section 24, if extrusion molding is performed as it is, the molding speed in the outer peripheral section 24 is higher than the molding speed in the inside section 22 depending on the flowability of a raw material to be molded. Therefore, there arises a problem in that the pattern is curled, and thus a defective honeycomb structure 50 is liable to be produced as shown in FIG. 8.

SUMMARY OF THE INVENTION

The present invention has been achieved to solve the above problems with the related art, and accordingly an object thereof is to provide an extrusion die for honeycomb extrusion molding in which even in a honeycomb structure in which the walls forming the cells are thin and the cell density is different according to location and low, higher dimensional accuracy and strength can be provided by preventing cell deformation defects and poor formation of external wall such as curled pattern, and a manufacturing method therefor.

To attain the above object, the present invention provides an extrusion die for honeycomb extrusion molding, which comprises back holes for introducing a raw material to be molded and slits for extruding said raw material, and is used for extrusion molding of a honeycomb structure, wherein said extrusion die comprises an inside section, an outer peripheral section, and an outermost peripheral section; a width of the slit disposed in said outer peripheral section is wider than a width of the slit disposed in said inside section; and when a surface roughness (Ra) of the slits in said inside section and said outer peripheral section is 0.1 µm or smaller, or when the surface roughness (Ra) of the slits in said inside section and said outer peripheral section exceeds 0.1 µm, the relationship between the surface roughness a of slit in said inside section and the surface roughness b of slit in said outer peripheral section satisfies the condition that 0.1<a/b<10.

At this time, the inside section is preferably disposed more concavely than the outer peripheral section, and a difference in slit width between the outer peripheral section and the inner section is preferably 5 to 50 µm.

In the present invention, the number of slits in the outer peripheral section is preferably 1 to 20, and the width of the slit disposed in the outer most peripheral section is preferably wider than the width of the slit disposed in the inside section.

Also, in the present invention, it is preferable that all of the slits are obtained by grooving in a lattice form, and the ratio of slit depths in a wide portion at each intersection should be 10:7 to 10:10, or an absolute value difference of slit depth in the wide portion should be smaller than 0.2 mm, and all of the slits be formed by grinding using a grinding stone.

Further, in the present invention, all of the slits are preferably subjected to hard coating with a film thickness of 1 to 150 µm so as to be finished to a predetermined slit size, and the hard coating is preferably electroless plating or CVD.

Also, the present invention provides a manufacturing method for an extrusion die for honeycomb extrusion molding, which is used for extrusion molding of a honeycomb structure, said extrusion die having back holes for introducing a raw material to be molded and slits for extruding said raw material, the slits being formed in an inside section, an outer peripheral section, and an outermost peripheral section of the extrusion die, and the slits having a different slit width in each section, the manufacturing method which comprises grinding a metal body by means of a grinding stone to form all of said slits of the extrusion die.

In the present invention, it is preferable that all of the slits are obtained by grooving in a lattice form, and the ratio of slit depths in a wide portion at each intersection should be 10:7 to 10:10, or an absolute value difference of slit depth in the wide portion should be smaller than 0.2 mm.

Also, in the present invention, all of the slits are preferably subjected to hard coating with a film thickness of 1 to 150 µm so as to be finished to a predetermined slit size, and the hard coating is preferably electroless plating or CVD.

Further, in the present invention, it is preferable that at the time of grinding using a grinding stone, grinding should be performed while the cut depth of the grinding stone is adjusted appropriately so that the slit depth at a slit intersection is made optimal.

DETAILED DESCRIPTION OF PREFERRED EMBODIMENT

An embodiment of the present invention will now be described in detail with reference to the accompanying drawings.

Figure 1A:
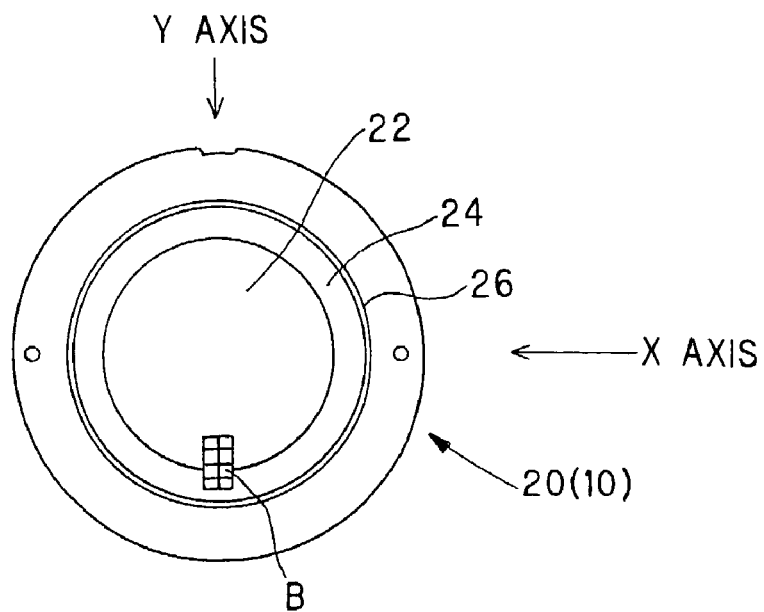
FIGS. 1(a) and 1(b) are views showing one example of an extrusion die for honeycomb extrusion molding, FIG. 1(a) being a front view, and FIG. 1(b) being a partially enlarged perspective view of portion B of (a)
Figure 1B:
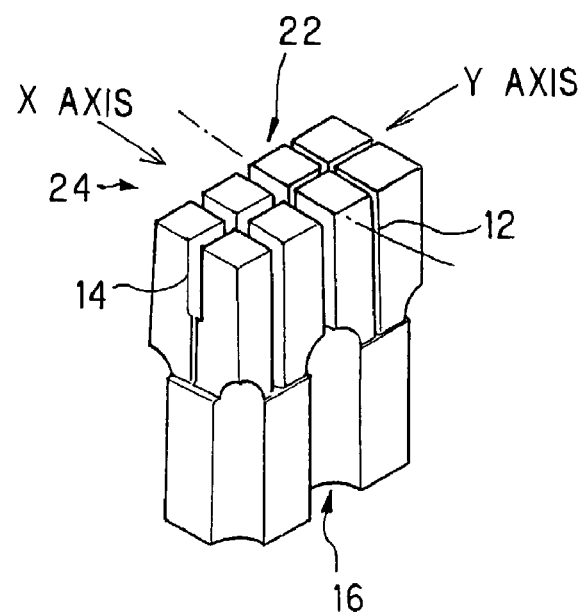

FIGS. 1(a) and 1(b) are views showing one example of an extrusion die for honeycomb extrusion molding, FIG. 1(a) being a front view, and FIG. 1(b) being a partially enlarged perspective view of portion B of (a).

As shown in FIG. 1, the extrusion die in accordance with the present invention is an extrusion die 20 which has back holes 16 for introducing a raw material to be molded and slits 12 and 14 for extruding the raw material, and is used for extrusion molding of a honeycomb structure.

The extrusion die 20 is made up of an inside section 22, an outer peripheral section 24, and an outermost peripheral section 26. The width of the slit 14 disposed in the outer peripheral section 24 is wider than the width of the slit 12 disposed in the inside section 22, and when the surface roughness (Ra) of the slits 12 and 14 in the inside section and the outer peripheral section is 0.1 μm or smaller, or when the surface roughness (Ra) of the slits 12 and 14 in the inside section and the outer peripheral section exceeds 0.1 μm, the relationship between the surface roughness a of slit in the inside section and the surface roughness b of slit in the outer peripheral section satisfies the condition that 0.1<a/b<10.

Figure 2A:
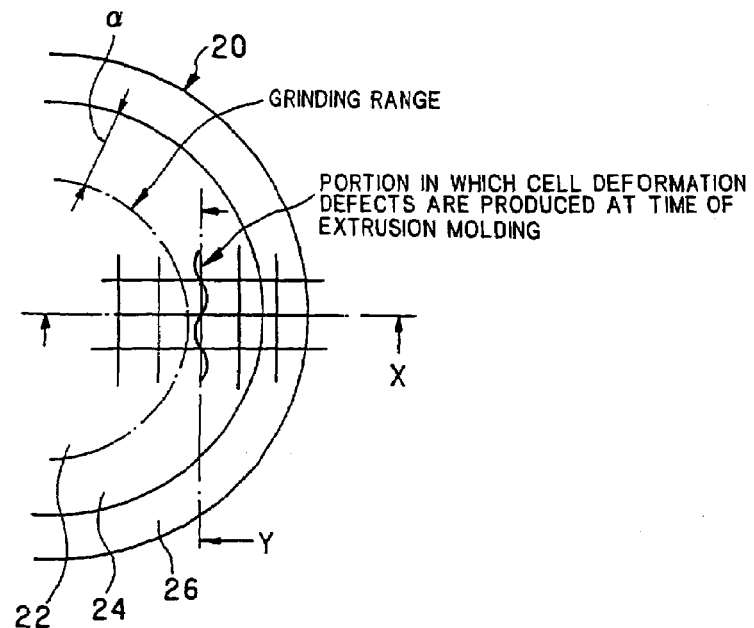
FIGS. 2(a) and 2(b) are views for illustrating a grinding method for an extrusion die for honeycomb extrusion molding in accordance with the present invention, FIG. 2(a) being a schematic view, and FIG. 2(b) being an enlarged view of an essential portion of (a)

At this time, as shown in FIG. 2(a), the number of slits α in the outer peripheral section 24 is preferably 1 to 20.

In the present invention, it is preferable that the width of a slit 14 disposed in the outermost peripheral section be wider than the width of the slit 12 disposed in the inside section because of improved moldability at the time when the honeycomb structure is extrusion molded.

Figure 2B:
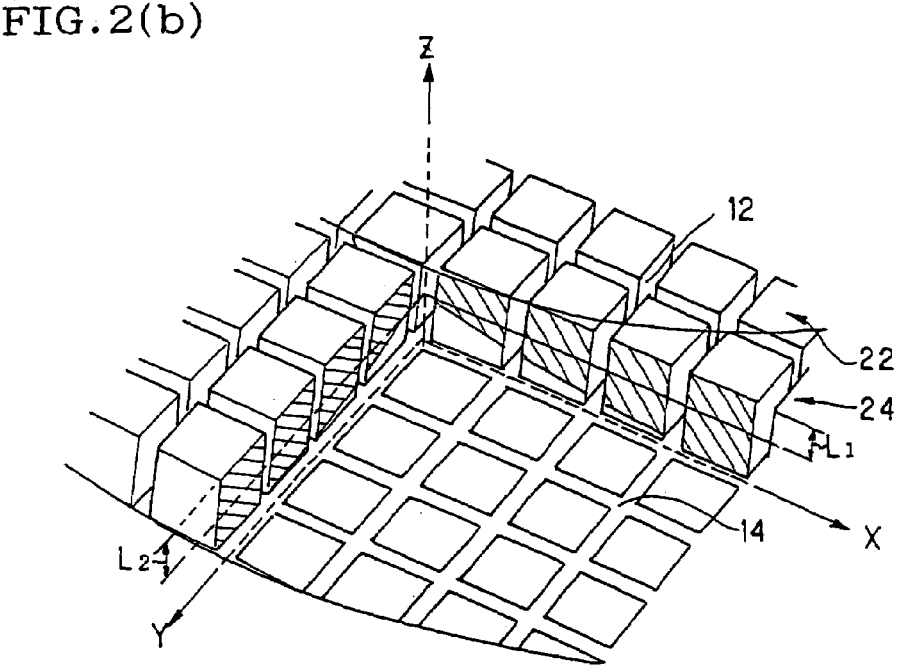

As shown in FIG. 2(b), in the extrusion die in accordance with the present invention, all of the slits 12 and 14 are obtained by grooving in a lattice form. It is preferable that the ratio of depths ($L_1$, $L_2$) of slits in the wide portion at each intersection be 10:7 to 10:10, or an absolute value difference ($|L_1-L_2|$) of slit depth in the wide portion be smaller than 0.2 mm.

Also, in the extrusion die 20 in accordance with the present invention, all of the slits 12 and 14 are preferably formed by grinding using a grinding stone.

All of the slits 12 and 14 in the extrusion die in accordance with the present invention are preferably subjected to hard coating with a film thickness of 1 to 150 μm so as to be finished to a predetermined slit size.

The aforementioned hard coating is not subject to any special restriction, but is preferably electroless plating or CVD.

Figure 3:
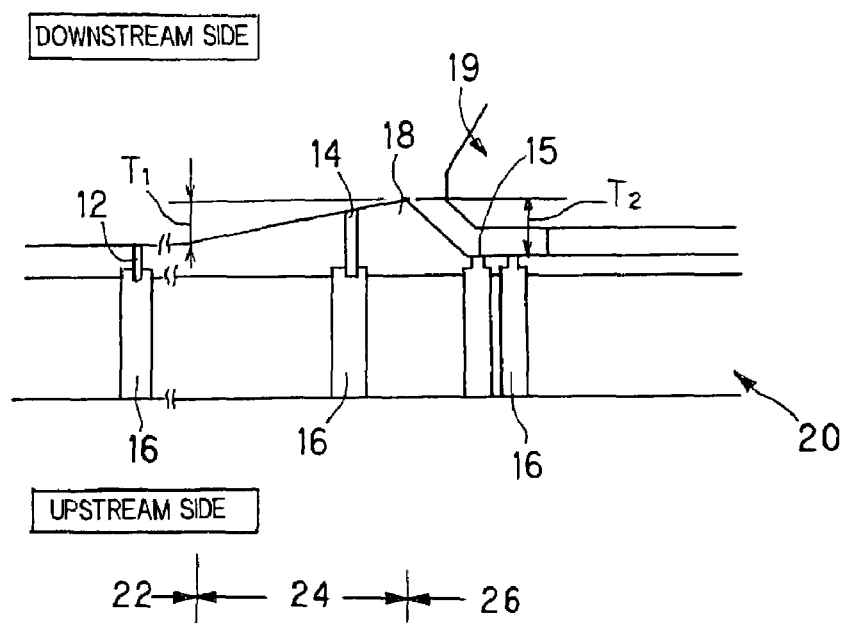
FIG. 3 is a partially sectional view showing one example of an extrusion die for honeycomb extrusion molding in accordance with the present invention.

Also, in the extrusion die in accordance with the present invention, as shown in FIG. 3, a step portion 18 is preferably provided so that the inside section 22 is more concave than the outer peripheral section 24.

Figure 8:
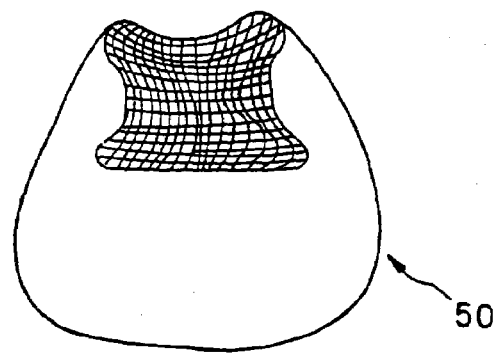
FIG. 8 is a perspective view showing one example of a defective conventional honeycomb structure with a curled pattern.

The reason for this is as follows: The slit height in the inside section 22 is lower than the slit height in the outer peripheral section 24 so that the extrusion resistance of raw material at the time of extrusion molding is equal in the slit 12 in the inside section 22 and the slit 14 in the outer peripheral section 24, by which the molding pattern can be made flat, so that a defective honeycomb structure with curled pattern (see FIG. 8) can be prevented from being produced. Also, since the molding pattern can be adjusted easily, the production efficiency of honeycomb structure can be enhanced.

At this time, in the extrusion die in accordance with the present invention, it is preferable that a difference in slit width between the outer peripheral section 24 and the inside section 22 be 5 to 50 μm.

Figure 4:
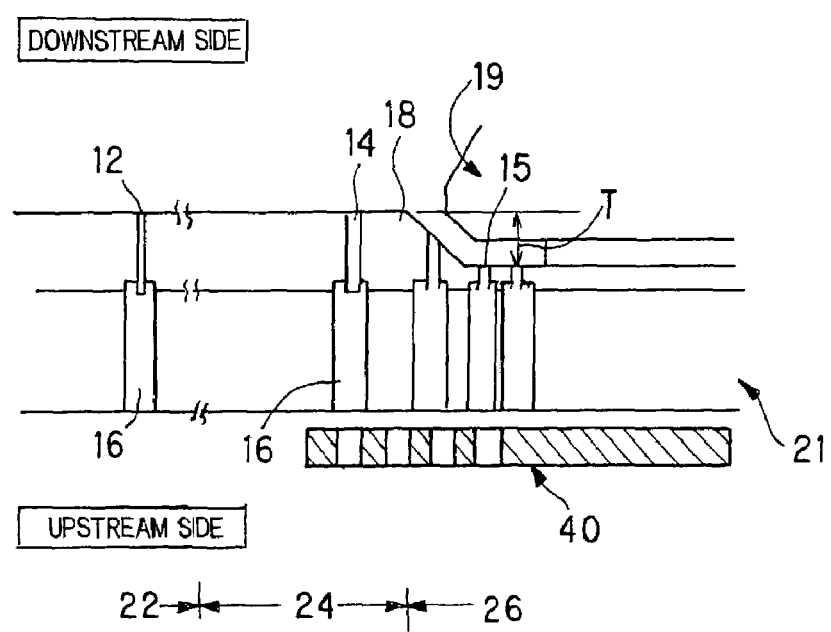
FIG. 4 is a partially sectional view showing another example of an extrusion die for honeycomb extrusion molding in accordance with the present invention.
Figure 5A:
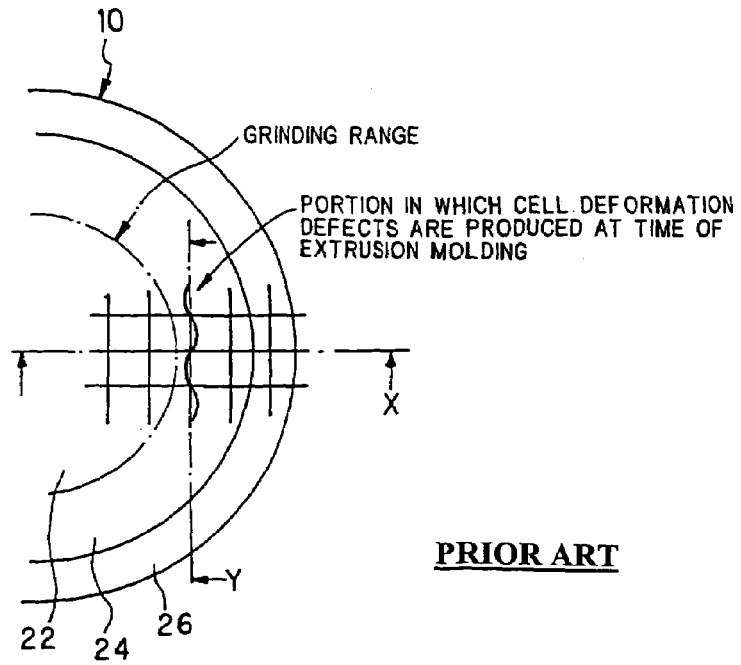
FIGS. 5(a) and 5(b) are views for illustrating a grinding method for a conventional extrusion die for honeycomb extrusion molding, FIG. 5(a) being a schematic view, and FIG. 5(B) being an enlarged view of an essential portion of (a)
Figure 5B:
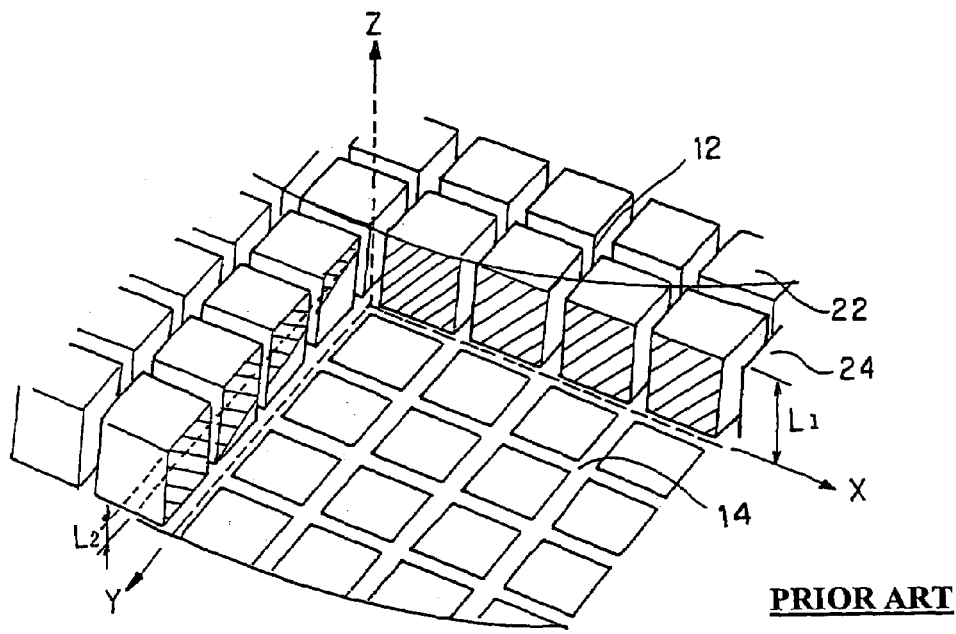
Figure 6:
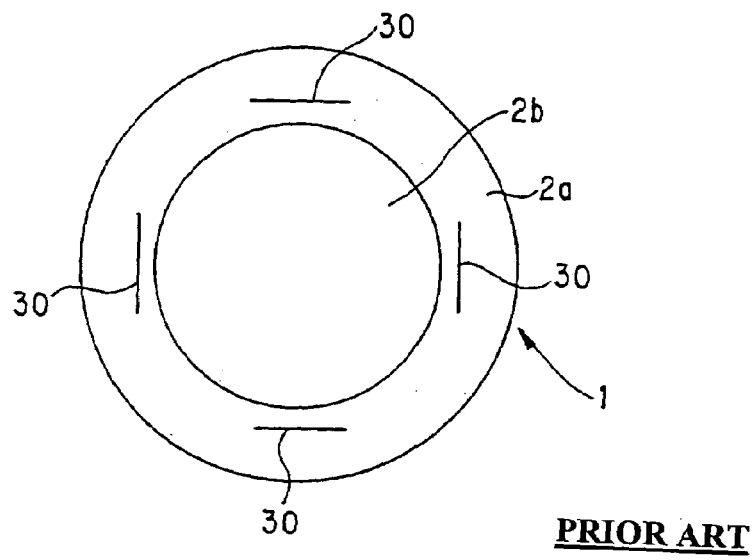
FIG. 6 is a schematic view showing a state in which cell deformation of a conventional honeycomb structure occurs.
Figure 7:
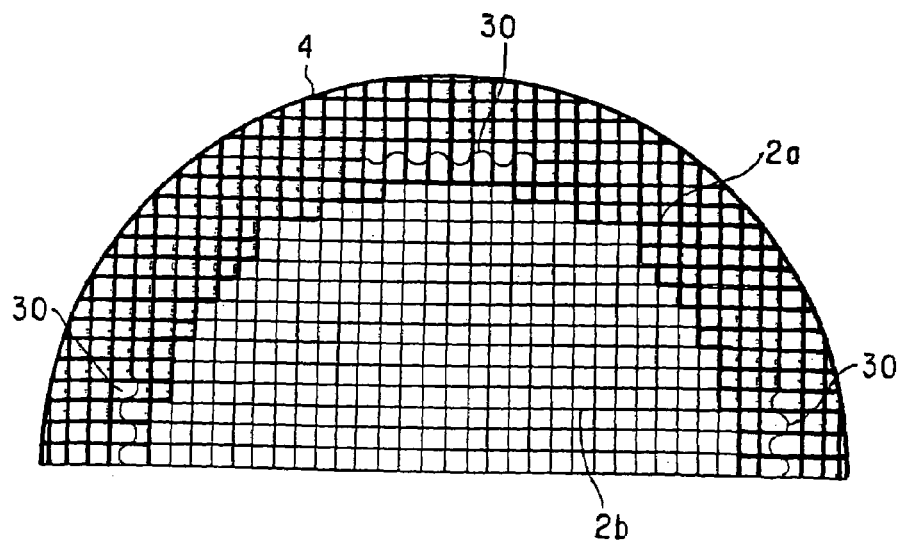
FIG. 7 is an enlarged view of an essential portion of FIG. 6.

As shown in FIG. 4, in the extrusion die in accordance with the present invention, a backing plate 40 is preferably provided on the upstream side of the slit 14 in the outer peripheral section 24.

Thereby, the extrusion speed of raw material in the slit 14 can be adjusted at the time of extrusion molding, so that the same effects as those of the extrusion die shown in FIG. 3 can be achieved.

Next, a manufacturing method for the extrusion die in accordance with the present invention will be described.

The main feature of the manufacturing method for the extrusion die in accordance with the present invention is to form all slits by grinding using a grinding stone. Specifically, according to the manufacturing method of the present invention, a metal body (a metal block) is ground by means of a grinding stone to make an extrusion die. Namely, all of slits of the extrusion die should be formed by grinding by means of a grinding stone.

By this feature, even when an extrusion die with a slit width of 2 to 3 mil (about 0.05 to 0.075 mm) or narrower is manufactured, the machining accuracy (±2 to 3 μm) of slit width can be secured sufficiently, and thus the extrusion pattern of extrusion die can be made proper.

The extrusion die may be made of martensitic stainless steel such as SUS431 or SUS630.

At this time, the grinding method in the present invention is to perform grooving of all of the slits 12 and 14 in a lattice form as shown in FIG. 2(b). At this time, it is preferable that grinding should be performed while the cut depth of grinding stone is adjusted so that the ratio of depths ($L_1$, $L_2$) of slits in the wide portion at each intersection is 10:7 to 10:10, or the absolute value difference ($|L_1-L_2|$) of slit depth in the wide portion is smaller than 0.2 mm.

By the above-described manufacturing method, in the extrusion die in accordance with the present invention, cell deformation defects and poor formation of external wall such as curled pattern can be prevented.

Thereby, even in a honeycomb structure in which the walls forming the cells are thin and the cell density is different according to location and low, higher dimensional accuracy and strength can be provided, and also the honeycomb structure can be manufactured in high yields, so that the manufacturing cost of honeycomb structure can further be decreased.

EXAMPLES

In an extrusion die (see FIG. 1) for a product with a cell density of 900 cpsi (cells/inch$^2$) and an outside diameter of 100 mm, all of the slits 12 and 14 were grooved in a lattice form using a grinding stone, and grinding was performed while the cut depth in the Z direction was adjusted appropriately so that the absolute value difference ($|L_1-L_2|$) of slit depth in the wide portion in the X and Y directions at each intersection was smaller than 0.05 mm.

At this time, extrusion dies in which the surface roughness (Ra) of the slits 12 and 14 in the inside section and the outer peripheral section is as given in Table 1 were prepared (examples 1 and 2, comparative examples 1 and 2).

Next, the extrusion die was coated with Ni plating so that a predetermined slit width (width of slit 12:50 μm, width of slit 14:80 μm [about 10 cells from the inside section 22]) as shown in FIG. 1(b) was provided, and then the slit outlet face in the inside section 22 was ground 0.3 mm so that the inside section 22 was more concave than the outer peripheral section 24 as shown in FIG. 3.

Figures 9A, 9B:
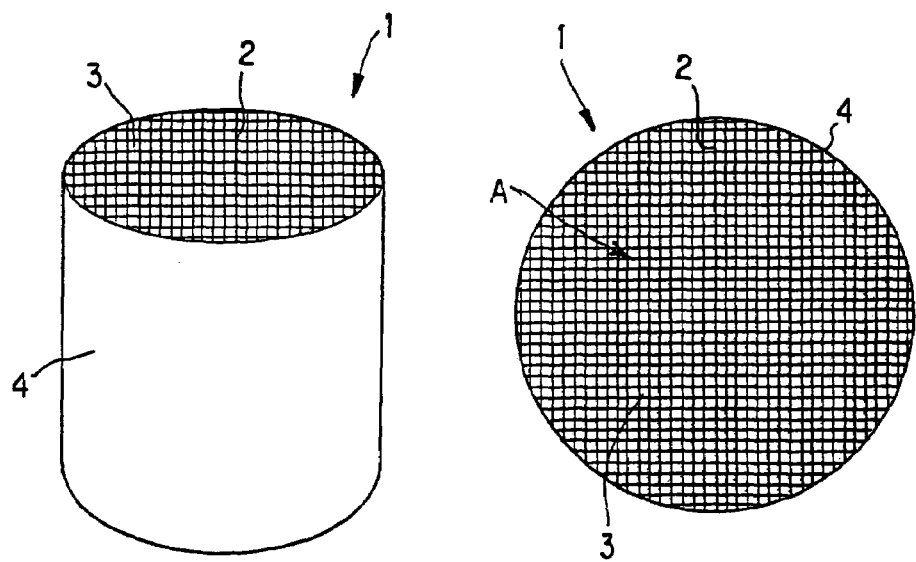
FIGS. 9(a) and 9(b) are explanatory views schematically showing one example of a conventional ceramic honeycomb structure, FIG. 9(a) being a perspective view, and FIG. 9(b) being a plan view.
Figure 10:
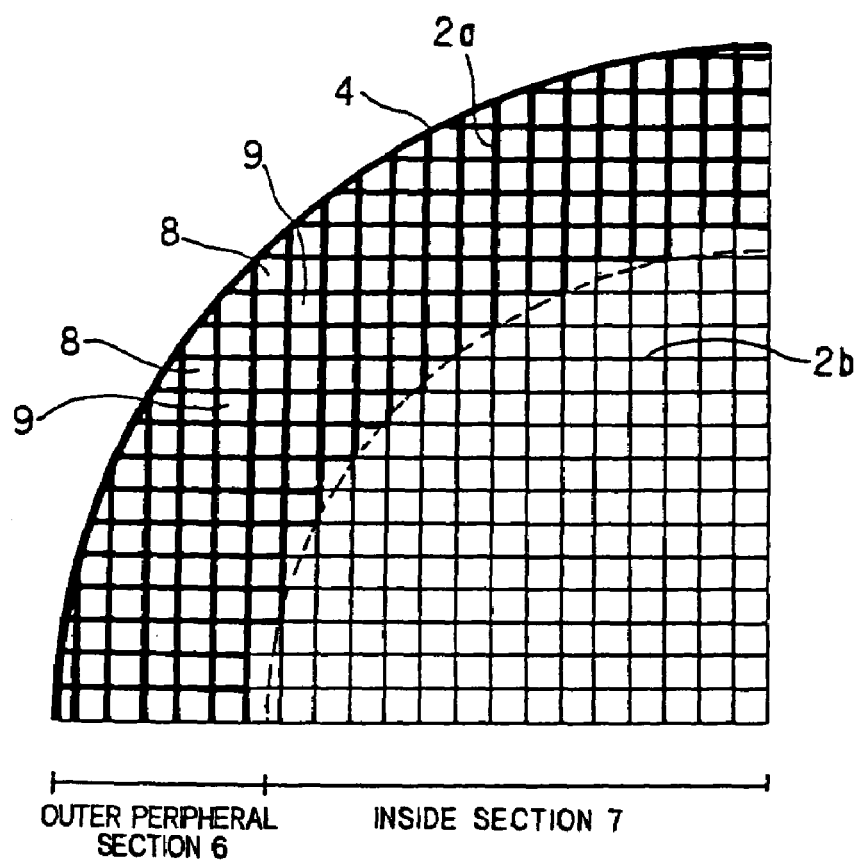
FIG. 10 is a partially enlarged view of portion A of FIG. 9(b).

After a raw material obtained by mixing talc, kaolin, alumina, water, and a binder was extrusion molded by using the above-described extrusion die, the molded product was fired. Thereby, cordierite honeycomb structures (see FIGS. 9 and 10) with a cell density of 900 cpsi (cells/inch$^2$) were manufactured. The results are given in Table 1.

TABLE 1

| | Slit surface roughness in outer peripheral section (μm) | Slit surface roughness in inside section (μm) | Defective cell formation | Defective external wall formation | Evaluation |
|---|---|---|---|---|---|
| Example 1 | 0.05 | 0.05 | Absent | Absent | ⊙ |
| Example 2 | 0.40 | 0.05 | Absent | Absent | ○ |

TABLE 1-continued

| | Slit surface roughness in outer peripheral section (μm) | Slit surface roughness in inside section (μm) | Defective cell formation | Defective external wall formation | Evaluation |
|---|---|---|---|---|---|
| Comparative example 1 | 0.50 | 0.05 | Present | Absent | x |
| Comparative example 2 | 0.60 | 0.05 | Present | Absent | x |

(Consideration)

For examples 1 and 2, when the surface roughness (Ra) of the slits in the inside section and the outer peripheral section was 0.1 μm or smaller, or when the surface roughness (Ra) of the slits in the inside section and the outer peripheral section exceeded 0.1 μm, the relationship between the surface roughness a of slit in the inside section and the surface roughness b of slit in the outer peripheral section satisfied the condition that 0.1<a/b<10, so that there were no deformation (for example, cell deformation defects) of the basic cell wall 2a and no deformation of the outermost peripheral cell 8, and the molding pattern was good. Therefore, honeycomb structures having an ISO strength of 10 kg/cm$^2$ or higher could be obtained.

On the other hand, for comparative examples 1 and 2, deformation (for example, cell deformation defects) of the basic cell wall 2a and deformation of the outermost peripheral cell 8 occurred.

Also, for examples 1 and 2, the molding pattern could be made flat by making the slit outlet face in a concave shape, so that a defective honeycomb structure with a curled pattern (see FIG. 8) was prevented from being produced. Also, since the molding pattern could be adjusted easily, the production efficiency of honeycomb structure could be enhanced.

As described above, according to the present invention, cell deformation defects and poor formation of external wall such as curled pattern can be prevented. Thereby, there can be provided an extrusion die for honeycomb extrusion molding in which even in a honeycomb structure in which the walls forming the cells are thin and the cell density is different according to location and low, higher dimensional accuracy and strength can be provided.

What is claimed is:

1. An extrusion die for honeycomb extrusion molding, comprising:
back holes for introducing a raw material to be molded;
slits for extruding said raw material;
wherein said extrusion die comprises an inside section;
an outer peripheral section; and
an outermost peripheral section;
wherein:
all of said slits are formed by grinding a metal body by means of a disk grinding stone and all of said slits having a constant cross-section;
a width of the slits disposed in said outer peripheral section is wider than a width of the slits disposed in said inside section; and
a surface roughness (Ra) of the slits in said inside section a is 0.1 μm or smaller; and
the ratio of slit depths in a said outer peripheral section at each intersection is 10:7 to 10:10, or an absolute value difference of slit depth in said outer peripheral section is smaller than 0.2 mm.

2. The extrusion die for honeycomb extrusion molding according to claim 1, wherein a difference in slit width between said outer peripheral section and said inner section is 5 to 50 μm.

3. The extrusion die for honeycomb extrusion molding according to claim 1, wherein the number of slits in said outer peripheral section is 1 to 20.

4. The extrusion die for honeycomb extrusion molding according to claim 1, wherein the width of the slit disposed in said outermost peripheral section is wider than the width of the slit disposed in said inside section.

5. The extrusion die for honeycomb extrusion molding according to claim 1, wherein all of said slits are subjected to hard coating with a film thickness of 1 to 150 μm so as to be finished to a predetermined slit size.

6. The extrusion die for honeycomb extrusion molding according to claim 1, wherein the hard coating is electroless plating or CVD.

7. The extrusion die for honeycomb extrusion molding according to claim 1, further comprising a backing plate configured such that the extrusion resistance of raw material in the slits is substantially equal.

8. The extrusion die for honeycomb extrusion molding according to claim 1, wherein said inside section is disposed more concavely than said outer peripheral section.

* * * * *